United States Patent [19]
Gomez

[11] Patent Number: 5,957,655
[45] Date of Patent: Sep. 28, 1999

[54] LID INFEED SYSTEM USING A VACUUM

[75] Inventor: Felix A. Gomez, Bergenfield, N.J.

[73] Assignee: Polytype America Corporation, Mahwah, N.J.

[21] Appl. No.: 09/151,198

[22] Filed: Sep. 10, 1998

[51] Int. Cl.[6] .................................................. B65G 59/10
[52] U.S. Cl. ................................ 414/798.9; 198/377.08; 198/438
[58] Field of Search ......................... 198/377.04, 377.08, 198/438; 271/31.1; 414/797, 798.9

[56] References Cited

U.S. PATENT DOCUMENTS

| | | |
|---|---|---|
| 2,776,037 | 1/1957 | Baigent . |
| 3,051,355 | 8/1962 | Honor . |
| 3,101,866 | 8/1963 | Anderson . |
| 3,439,793 | 4/1969 | Rakestraw . |
| 3,760,453 | 9/1973 | Neumann . |
| 4,005,668 | 2/1977 | Washington et al. . |
| 4,435,114 | 3/1984 | Fardin . |
| 4,462,745 | 7/1984 | Johnson et al. . |
| 4,674,935 | 6/1987 | Feliks et al. . |
| 4,697,973 | 10/1987 | Hahn et al. . |
| 4,758,126 | 7/1988 | Johnson et al. . |
| 4,822,234 | 4/1989 | Johnson et al. ....................... 414/798.9 |
| 5,354,045 | 10/1994 | Boldrini et al. ................... 271/31.1 X |
| 5,470,195 | 11/1995 | Blank et al. ............................. 414/797 |
| 5,564,894 | 10/1996 | Moncrief ............................... 414/798.9 |
| 5,653,576 | 8/1997 | Pearce .................................... 414/797.7 |

*Primary Examiner*—Janice L. Krizek
*Attorney, Agent, or Firm*—Richard M. Goldberg

[57] ABSTRACT

A lid infeed system includes a pair of adjacent and parallel spinning rods for holding a stack of lids thereon; a rotatable transfer plate at one end of the spinning rods and rotatable in a plane substantially transverse to an axial direction of the spinning rods, the transfer plate having three spaced openings through which a vacuum is applied for holding and carrying a forwardmost lid from the stack of lids during rotation of the transfer plate, and the transfer plate reducing in thickness from a center thereof to a periphery thereof, so as to provide an annular sloping front face against which the forwardmost lid is held; an adjustable hold down bar positioned above the spinning rods and in front of the transfer plate for holding down the stack of lids on the spinning rods; a vacuum block for limiting the supply of the vacuum through each opening, for a predetermined angular extent of rotation of the transfer plate, the vacuum block having a front face with a recess therein which extends for a predetermined angular extent, and the transfer plate is positioned against the front face of the vacuum block such that the vacuum is applied to each opening in the transfer plate during alignment of each opening with the recess; and a vacuum roller for carrying the forwardmost lid after the vacuum is released at an end of the predetermined angular extent of rotation.

26 Claims, 4 Drawing Sheets

LID INFEED SYSTEM USING A VACUUM

BACKGROUND OF THE INVENTION

The present invention relates generally to the feeding of lids of containers, and more particularly, is directed to a lid infeed system using a vacuum.

Conventionally, in order to transport container lids, a plurality of lids in stacked relation to each other, ride on two spinning rods which are adjacent and parallel to each other. As the rods spin, the lids are caused to move forwardly thereon.

A hood is provided adjacent and above the spinning rods and has an opening at one end with a width slightly greater than the width of a lid so that one lid can fit therein. In order to separate the lids from each other and push the forwardmost lid into the hood, a leaf spring is provided immediately adjacent the opening of the hood and engages the top of the forwardmost lid, serving to bias the forwardmost lid into good friction engagement with the spinning rods. As a result, the forwardmost lid is moved into the opening of the hood by the friction engagement with one of the spinning rods.

The lids travel through the hood and exit an outlet opening thereof, where they are adhered to a vacuum roller having openings through which a vacuum is applied.

A problem with this arrangement is that the apparatus must be changed for different size lids. In such case, the hood must be changed, and the spring adjusted. This is disadvantageous from a manufacturing standpoint.

In many cases, the lids have lips which nest within each other in the stack. As a result of this nesting arrangement, it is sometimes difficult to disengage the forwardmost lid from the remainder of the stack, which may result in the machine being shut down.

Still further, due to the purely mechanical arrangement of the spring and spinning rods, it is possible that the spring may not engage the forwardmost lid with the correct force, so that there may be too much force, causing problems with bending or transporting of the lid, or too little force, which may result in too little friction with the spinning rods.

OBJECTS AND SUMMARY OF THE INVENTION

Accordingly, it is an object of the present invention to provide a lid infeed system using a vacuum that overcomes the aforementioned problems.

It is another object of the present invention to provide a lid infeed system using a vacuum that transports the forwardmost lid from the stack to the vacuum roller.

It is still another object of the present invention to provide a lid infeed system using a vacuum that separates the forwardmost lid from the nesting arrangement with the stack.

It is yet another object of the present invention to provide a lid infeed system using a vacuum that eliminates the mechanical arrangement of the spring and hood.

In accordance with an aspect of the present invention, a lid infeed system includes a pair of spinning rods for holding a stack of lids thereon; a rotatable transfer plate positioned at one end of the pair of spinning rods and being rotatable in a plane substantially transverse to an axial direction of the spinning rods, the transfer plate having at least one opening through which a vacuum is applied; and an arrangement for limiting the supply of the vacuum through each opening, for a predetermined angular extent of rotation of the transfer plate. The spinning rods are parallel and adjacent to each other. The arrangement includes a vacuum block having a front face with a recess therein which extends for the predetermined angular extent, and the transfer plate is positioned against the front face of the vacuum block such that the vacuum is applied to each opening in the transfer plate during alignment of each opening with the recess. The vacuum block also includes an opening in communication with the recess for supplying a vacuum to the recess, and the recess is in alignment with a vertical plane extending through a center line between the spinning rods.

A hold down bar is positioned above the spinning rods and in front of the transfer plate for holding down the stack of lids on the spinning rods. An adjustment mechanism adjusts the height of the hold down bar in relation to the spinning rods.

In accordance with another aspect of the present invention, a lid infeed system includes a pair of spinning rods for holding a stack of lids thereon; a rotatable transfer plate positioned at one end of the pair of spinning rods and being rotatable in a plane substantially transverse to an axial direction of the spinning rods, the transfer plate having at least one opening through which a vacuum is applied for holding a forwardmost lid from the stack of lids and carrying the forwardmost lid during rotation of the transfer plate; an arrangement for limiting the supply of the vacuum through each opening, for a predetermined angular extent of rotation of the transfer plate; and a vacuum roller for carrying the forwardmost lid after the vacuum is released at an end of the predetermined angular extent of rotation.

The vacuum roller is positioned at a lower end and behind the transfer plate, and includes an outer cylindrical surface with a plurality of openings therein through which a vacuum is applied for holding the forwardmost lid thereon.

In accordance with still another aspect of the present invention, a lid infeed system includes a pair of spinning rods for holding a stack of lids thereon; a rotatable transfer plate positioned at one end of the pair of spinning rods and being rotatable in a plane substantially transverse to an axial direction of the spinning rods, the transfer plate having at least one opening through which a vacuum is applied for holding a forwardmost lid from the stack of lids and carrying the forwardmost lid during rotation of the transfer plate, and the transfer plate reducing in thickness from a center thereof to a periphery thereof, so as to provide an annular sloping front face against which the forwardmost lid is held; and an arrangement for limiting the supply of the vacuum through each opening, for a predetermined angular extent of rotation of the transfer plate.

The above and other objects, features and advantages of the invention will become readily apparent from the following detailed description thereof which is to be read in connection with the accompanying drawing.

DETAILED DESCRIPTION

Figure 4:
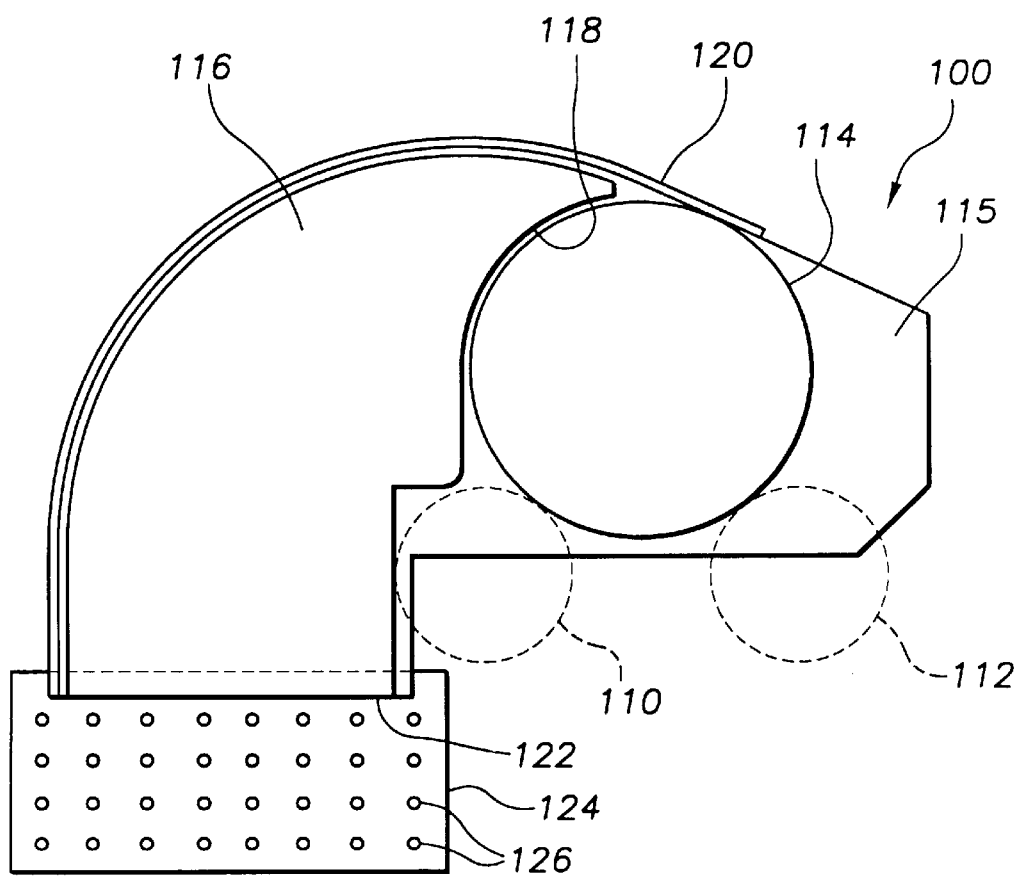
FIG. 4 is a plan view of a portion of a lid infeed system according to the prior art.

Referring initially to FIG. 4, a lid infeed arrangement 100 according to the prior art includes two adjacent and parallel spinning rods 110 and 112. A plurality of lids 114 are in stacked relation to each other and ride on rods 110 and 112. As rods 110 and 112 spin, lids 114 are caused to move forwardly thereon, against a backplate 115.

A hood 116 is provided against backplate 115 and is positioned adjacent to and above spinning rods 110 and 112. Hood 116 includes an inlet opening 118 having a width slightly greater than the width of a lid 114 so that one lid 114 can fit therein. A leaf spring 120 is provided immediately adjacent and above opening 118 of hood 116 and serves to push or bias the forwardmost lid 114 into good friction engagement with spinning rods 110 and 112. As a result, the forwardmost lid 114 is moved into inlet opening 118 of hood 116 by friction engagement with spinning rod 110.

Lids 114 travel through hood 116 and exit an outlet opening 122 thereof, where lids 114 are adhered to a vacuum roller 124 having openings 126 through which a vacuum is applied and to which lids 114 adhere through the vacuum.

A problem with this arrangement is that the apparatus must be modified for different size or diameter lids 114. In such case, hood 116 must be changed, and spring 120 adjusted or changed. This is disadvantageous from a manufacturing standpoint.

Further, in many cases, lids 114 have lips which nest within each other in the stack. As a result of this nesting arrangement, it is sometimes difficult to disengage the forwardmost lid 114 from the remainder of the stack, which may result in the machine being shut down.

Still further, due to the purely mechanical arrangement of leaf spring 120 and spinning rods 110 and 112, it is possible that leaf spring 120 may not engage the forwardmost lid 114 with the correct force, so that there may be too much force, causing problems with bending or transporting of the lid 114, or too little force, which may result in too little friction with spinning rods 110 and 112.

Figure 1:
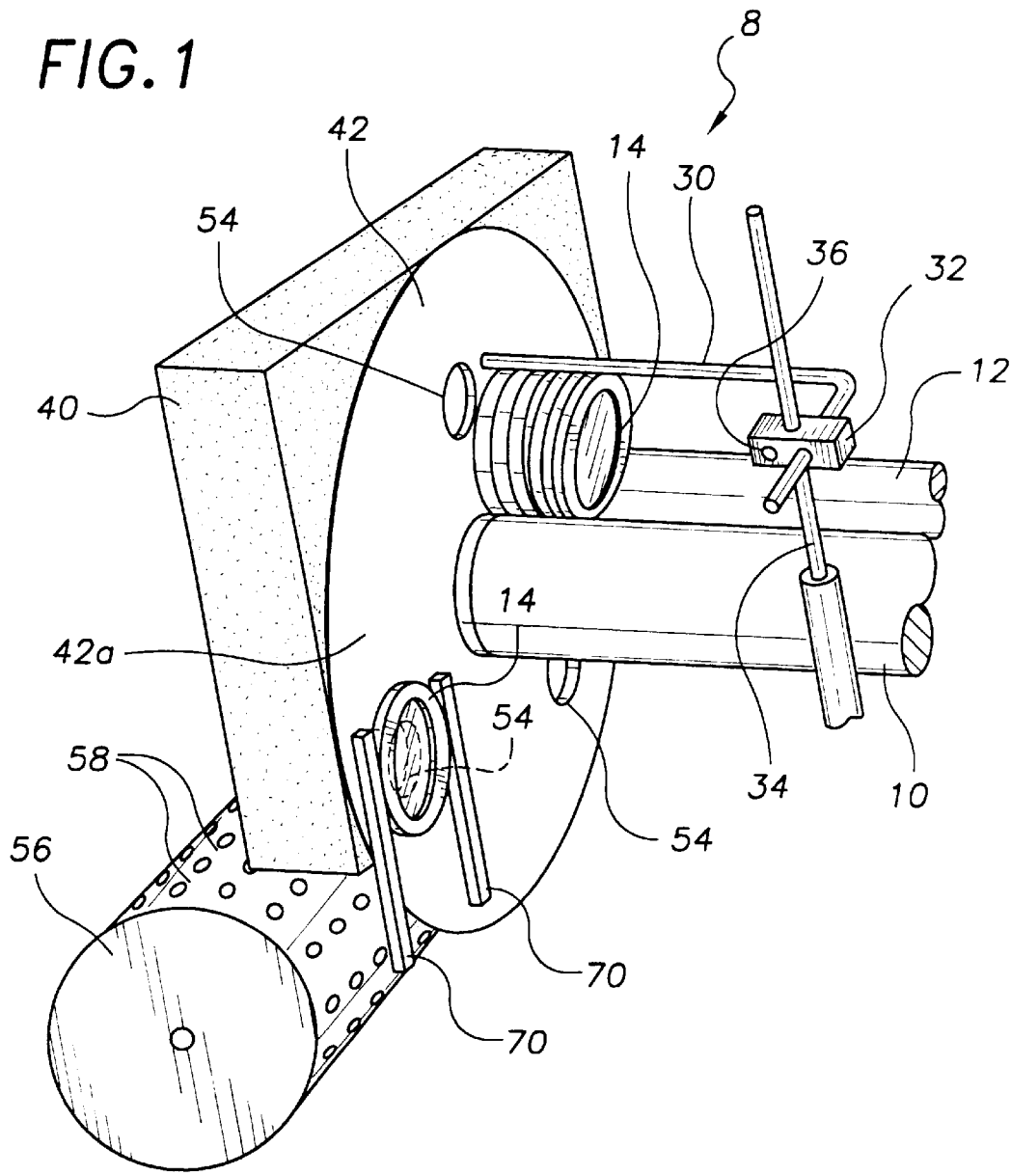
FIG. 1 is a perspective view of a lid infeed system using a vacuum according to the present invention.
Figure 2:
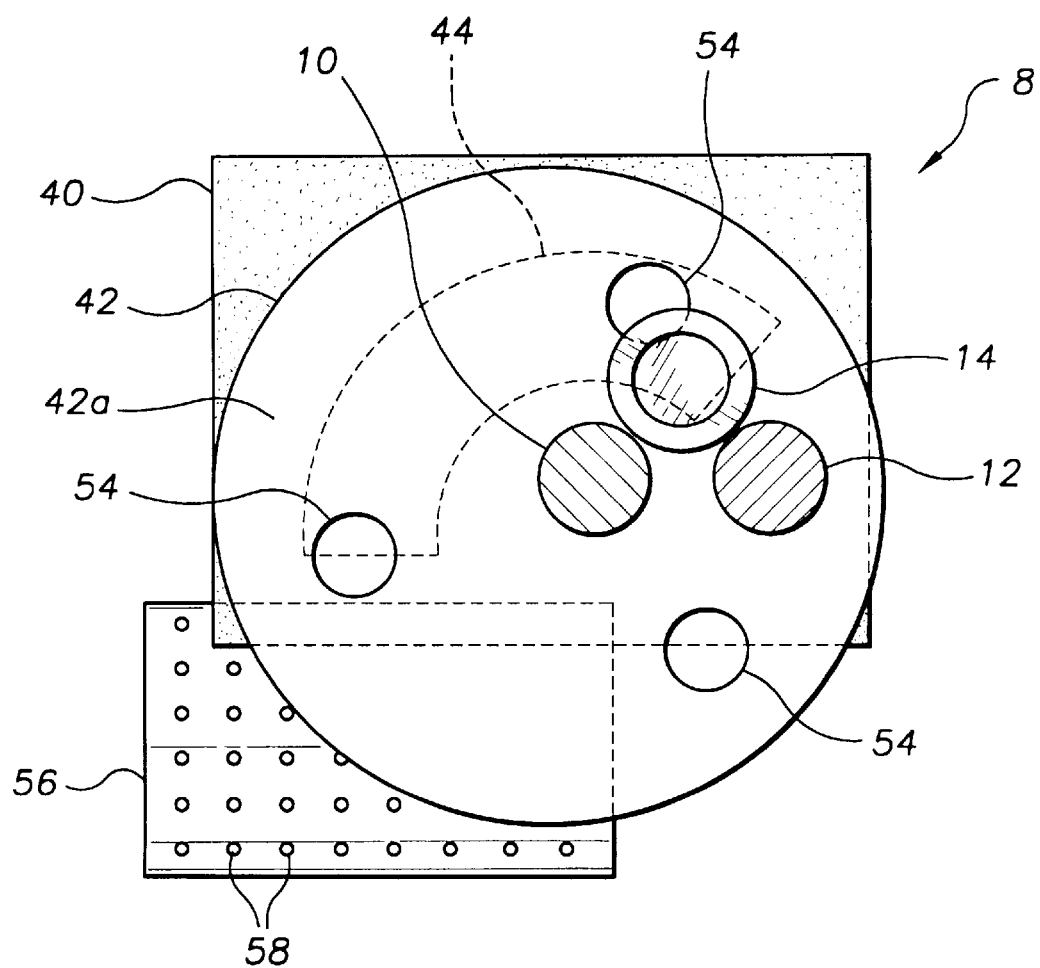
FIG. 2 is a plan view of a portion of the lid infeed system with various elements shown in phantom.
Figure 3:
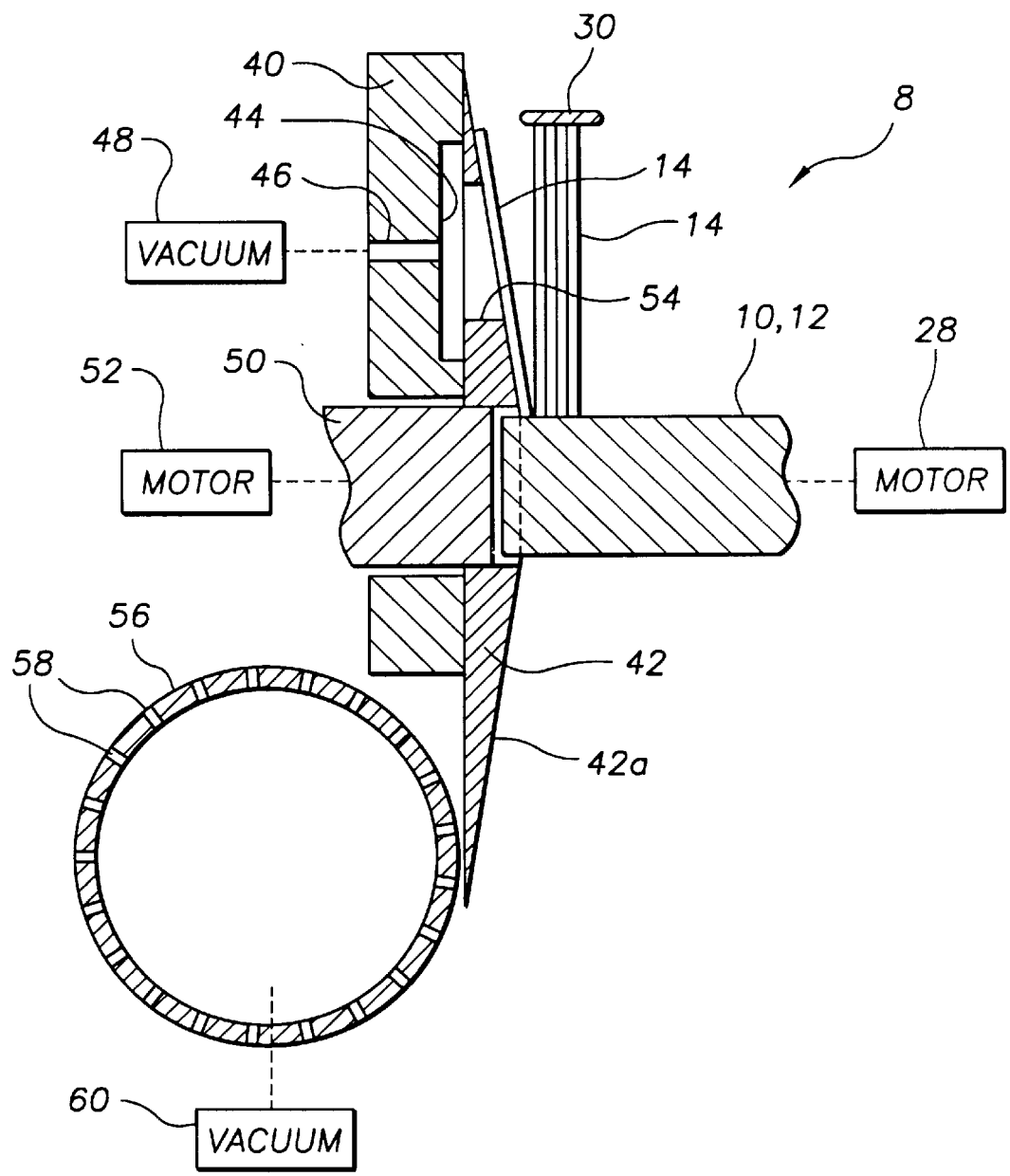
FIG. 3 is a cross-sectional view of the lid infeed system of FIG. 1.

Referring now to FIGS. 1–3, there is shown a lid infeed system 8 according to the present invention. Lid infeed system 8 includes two adjacent and parallel spinning rods 10 and 12 for moving a stack of lids 14 forwardly thereon. Spinning rods 10 and 12 are rotated by a motor drive 28 shown schematically in FIG. 3. An L-shaped hold down bar 30 is mounted in a block 32 that is movably mounted on a vertical rod 34 and can be held at a fixed position thereon by tightening a set screw 36. L-shaped bar 30 functions to engage the upper ends of lids 14 on spinning rods 10 and 12 so as to ensure that there is frictional engagement between lids 14 and spinning rods 10 and 12, while also preventing escape of lids 14 from spinning rods 10 and 12.

A vacuum block 40 is provided at the forward end of spinning rods 10 and 12, and a circular transfer plate 42 is positioned at the front face of vacuum block 40. As shown best in FIGS. 2 and 3, vacuum block 40 has an arcuate recess 44 at the front face thereof. Recess 44 can extend for any suitable angular range, such as 135 degrees, and extends through a vertical plane extending through a center line between spinning rods 10 and 12. An opening 46 through the rear of block 40 is in communication with recess 44 for supplying a vacuum thereto from a vacuum source 48.

Circular transfer plate 42 is rotatable by a shaft 50 connected axially therewith, with shaft 50 extending out through vacuum block 40 and driven by a motor drive 52. Circular transfer plate 42 has a plurality of openings 54 along a common imaginary circle, each opening 54 adapted to align with arcuate recess 44 as circular transfer plate 42 is rotated. Although three openings 54 are shown, the present invention is not limited by this number. When an opening 54 comes into alignment with arcuate recess 44 during rotation of circular transfer plate 42, the vacuum in arcuate recess 44 is applied to the respective opening 54. As a result, the forwardmost lid 14 is sucked into engagement with the front surface of circular transfer plate 42 and carried by circular transfer plate 42 during rotation thereof. It will be appreciated that circular transfer plate 42 is in contact with the front face of vacuum block 40 so as to provide a seal therewith to prevent escape of the vacuum.

As discussed above, in many cases, lids 14 have lips which nest within each other in the stack. As a result of this nesting arrangement, it is sometimes difficult to disengage the forwardmost lid from the remainder of the stack, which may result in the machine being shut down.

In accordance with a further aspect of the present invention, circular transfer plate 42 reduces in thickness from the center thereof to the annular periphery, so as to provide an annular sloping front face 42a. As shown best in FIG. 3, when an opening 54 is aligned by arcuate recess 44, the vacuum is applied through opening 54 to pull the leading or forwardmost lid 14 into engagement with annular sloping front face 42a. Thus, the forwardmost lid 14 is inclined with respect to the remaining lids 14 in the stack, so as to disengage from the nesting arrangement therewith. Accordingly, even if lids 14 are provided with lips, there are no problems with moving the forwardmost lid 14 away from the stack.

Thus, circular transfer plate 42 serves the dual purpose of separating the forwardmost lid 14 from the stack, and then transferring this lid 14 away from the stack by continued rotation thereof.

A vacuum roller 56 is provided immediately below and behind circular transfer plate 42. Vacuum roller 56 includes a plurality of vacuum holes 58 around the circumference thereof which are fluidly connected with a vacuum in the interior of vacuum roller 56, supplied thereto by a vacuum source 60. Further, guides 70 are provided in front of circular transfer plate 42 and corresponding in position to vacuum roller 56 to guide the carried lid 14 from transfer plate 42 to vacuum roller 56.

In operation, lids 14 are held between spinning rods 10 and 12 and L-shaped bar 30. As a result of the rotation of spinning rods 10 and 12, lids 14 are caused to move forwardly thereon. At this time, circular transfer plate 42 is also rotating, but at a much slower speed than spinning rods 10 and 12. As an opening 54 in circular transfer plate 42 aligns with one end of arcuate recess 44, a vacuum is applied therethrough, which functions to suck the leading or forwardmost lid 14 out of nesting engagement with the stack of lids and into engagement with annular sloping front face 42a of circular transfer plate 42, that is, at an inclination relative to the lids in the remainder of the stack. Upon continued rotation of circular transfer plate 42, the forwardmost lid 14 is carried by circular transfer plate 42 due to the vacuum applied through the respective opening 54.

As the respective opening 54 passes the opposite end of arcuate recess 44, the respective opening 54 is no longer in fluid communication with the vacuum applied thereto, and no longer holds the forwardmost lid 14 to front face 42a by vacuum pressure. However, at this time, the forwardmost lid 14 is close to the outer surface of vacuum roller 56, and the suction through vacuum holes 58 serves to hold the forwardmost lid 14 to vacuum roller 56 for further transfer. As a result, lids 14 are transferred from the stack of lids to vacuum roller 56 one at a time for further processing, such as a further printing operation or the like.

Thus, with the present invention, the forwardmost lid is transported from the stack to the vacuum roller by using a vacuum that separates the forwardmost lid from the nesting arrangement with the stack, and which eliminates the mechanical arrangement of the spring and hood.

It will be appreciated that various modifications can be made to the present invention. For example, vacuum block 40 could be eliminated, and a vacuum could be applied directly into the interior of circular transfer plate 42, with the vacuum being cut off in correspondence with the angular position thereof.

Having described a specific preferred embodiment of the invention with reference to the accompanying drawings, it will be appreciated that the present invention is not limited to that precise embodiment, and that various changes and modifications can be effected therein by one of ordinary skill in the art without departing from the scope or spirit of the invention as defined by the appended claims.

What is claimed is:

1. A lid infeed system comprising:
   a pair of spinning rods for holding a stack of lids thereon;
   a rotatable transfer plate positioned at one end of said pair of spinning rods and being rotatable in a plane substantially transverse to an axial direction of said spinning rods, said transfer plate having at least one opening through which a vacuum is applied; and
   an arrangement for limiting the supply of said vacuum through each of said at least one opening, for a predetermined angular extent of rotation of said transfer plate.

2. A lid infeed system according to claim 1, wherein said spinning rods are parallel and adjacent to each other.

3. A lid infeed system according to claim 1, wherein said arrangement includes a vacuum block having a front face with a recess therein which extends for said predetermined angular extent, and said transfer plate is positioned against said front face of said vacuum block such that the vacuum is applied to each said opening in said transfer plate during alignment of each said opening with said recess.

4. A lid infeed system according to claim 3, wherein the vacuum block includes an opening in communication with said recess for supplying a vacuum to said recess.

5. A lid infeed system according to claim 3, wherein said recess is in alignment with a vertical plane extending through a center line between said spinning rods.

6. A lid infeed system according to claim 1, further comprising a hold down bar positioned above said spinning rods and in front of said transfer plate for holding down said stack of lids on said spinning rods.

7. A lid infeed system according to claim 6, further comprising an adjustment mechanism for adjusting a height of said hold down bar in relation to said spinning rods.

8. A lid infeed system comprising:
   a pair of spinning rods for holding a stack of lids thereon;
   a rotatable transfer plate positioned at one end of said pair of spinning rods and being rotatable in a plane substantially transverse to an axial direction of said spinning rods, said transfer plate having at least one opening through which a vacuum is applied for holding a forwardmost lid from said stack of lids and carrying said forwardmost lid during rotation of said transfer plate;
   an arrangement for limiting the supply of said vacuum through each of said at least one opening, for a predetermined angular extent of rotation of said transfer plate; and
   a vacuum roller for carrying said forwardmost lid after said vacuum is released at an end of said predetermined angular extent of rotation.

9. A lid infeed system according to claim 8, wherein said spinning rods are parallel and adjacent to each other.

10. A lid infeed system according to claim 8, wherein said arrangement includes a vacuum block having a front face with a recess therein which extends for said predetermined angular extent, and said transfer plate is positioned against said front face of said vacuum block such that the vacuum is applied to each said opening in said transfer plate during alignment of each said opening with said recess.

11. A lid infeed system according to claim 10, wherein the vacuum block includes an opening in communication with said recess for supplying a vacuum to said recess.

12. A lid infeed system according to claim 10, wherein said recess is in alignment with a vertical plane extending through a center line between said spinning rods.

13. A lid infeed system according to claim 8, further comprising a hold down bar positioned above said spinning rods and in front of said transfer plate for holding down said stack of lids on said spinning rods.

14. A lid infeed system according to claim 13, further comprising an adjustment mechanism for adjusting a height of said hold down bar in relation to said spinning rods.

15. A lid infeed system according to claim 8, wherein said vacuum roller is positioned at a lower end and behind said transfer plate.

16. A lid infeed system according to claim 15, wherein said vacuum roller includes an outer cylindrical surface with a plurality of openings therein through which a vacuum is applied for holding the forwardmost lid thereon.

17. A lid infeed system comprising:
   a pair of spinning rods for holding a stack of lids thereon;
   a rotatable transfer plate positioned at one end of said pair of spinning rods and being rotatable in a plane substantially transverse to an axial direction of said spinning rods, said transfer plate having at least one opening through which a vacuum is applied for holding a forwardmost lid from said stack of lids and carrying said forwardmost lid during rotation of said transfer plate, and said transfer plate reducing in thickness from a center thereof to a periphery thereof, so as to provide an annular sloping front face against which the forwardmost lid is held; and
   an arrangement for limiting the supply of said vacuum through each of said at least one opening, for a predetermined angular extent of rotation of said transfer plate.

18. A lid infeed system according to claim 17, wherein said spinning rods are parallel and adjacent to each other.

19. A lid infeed system according to claim 17, wherein said arrangement includes a vacuum block having a front face with recess therein which extends for said predetermined angular extent, and said transfer plate is positioned against said front face of said vacuum block such that the vacuum is applied to each said opening in said transfer plate during alignment of each said opening with said recess.

20. A lid infeed system according to claim 19, wherein the vacuum block includes an opening in communication with said recess for supplying a vacuum to said recess.

21. A lid infeed system according to claim 19, wherein said recess is in alignment with a vertical plane extending through a center line between said spinning rods.

22. A lid infeed system according to claim 17, further comprising a hold down bar positioned above said spinning rods and in front of said transfer plate for holding down said stack of lids on said spinning rods.

23. A lid infeed system according to claim 22, further comprising an adjustment mechanism for adjusting a height of said hold down bar in relation to said spinning rods.

24. A lid infeed system according to claim 17, further comprising a vacuum roller for carrying said forwardmost lid after said vacuum is released at an end of said predetermined angular extent of rotation.

25. A lid infeed system according to claim 24, wherein said vacuum roller is positioned at a lower end and behind said transfer plate.

26. A lid infeed system according to claim 25, wherein said vacuum roller includes an outer cylindrical surface with a plurality of openings therein through which a vacuum is applied for holding the forwardmost lid thereon.

* * * * *